United States Patent
Stark et al.

(10) Patent No.: US 6,263,580 B1
(45) Date of Patent: Jul. 24, 2001

(54) CUTTERHEAD FOR A PORTABLE HANDHELD BRUSHCUTTER

(75) Inventors: Thomas Stark; Carsten Springer, both of Waiblingen; Andreas Scharfenberg, Murrhardt, all of (DE)

(73) Assignee: Andreas Stihl AG & Co., Waiblingen (DE)

(*) Notice: Subject to any disclaimer, the term of this patent is extended or adjusted under 35 U.S.C. 154(b) by 0 days.

(21) Appl. No.: 09/368,185

(22) Filed: Aug. 4, 1999

(30) Foreign Application Priority Data

Aug. 6, 1998 (DE) ............................ 198 35 504

(51) Int. Cl.⁷ .......................... A01G 3/06; A01D 34/00
(52) U.S. Cl. ............................... 30/276; 30/347
(58) Field of Search ................... 30/276, 349; 56/12.7, 56/12.5, 295

(56) References Cited

U.S. PATENT DOCUMENTS

| | | | |
|---|---|---|---|
| 4,043,103 | * 8/1977 | Lakin et al. | 30/276 |
| 4,091,538 | 5/1978 | Akiyama | 30/276 |
| 4,203,212 | * 5/1980 | Proulx | 30/276 |
| 4,205,439 | * 6/1980 | Sweet | 30/276 |
| 4,235,068 | 11/1980 | Comer | 56/12.7 |
| 4,249,311 | * 2/1981 | Inaga | 30/276 |
| 4,458,419 | * 7/1984 | Proulx | 30/276 |
| 4,571,831 | * 2/1986 | White, III | 30/276 |
| 4,580,394 | * 4/1986 | Baba | 30/276 |
| 4,640,084 | * 2/1987 | Baba | 30/276 |
| 4,813,140 | * 3/1989 | Calcinai | 30/276 |
| 4,817,288 | * 4/1989 | Hirose et al. | 30/276 |
| 5,339,526 | 8/1994 | Everts | 30/276 |
| 5,461,787 | * 10/1995 | Araki et al. | 30/276 |
| 5,490,641 | * 2/1996 | Worthing | 30/276 |
| 5,526,572 | * 6/1996 | Sugihara et al. | 30/276 |
| 5,671,536 | 9/1997 | Everts et al. | . |
| 5,743,019 | * 4/1998 | Berfield | 30/276 |
| 5,765,287 | * 6/1998 | Griffini et al. | 30/276 |
| 5,809,655 | * 9/1998 | Houben et al. | 30/276 |
| 5,855,068 | * 1/1999 | Zilly et al. | 30/276 |
| 5,906,051 | * 5/1999 | Nannen | 30/276 |

FOREIGN PATENT DOCUMENTS 0784919    7/1997 (EP).

* cited by examiner

Primary Examiner—Kenneth E. Peterson
Assistant Examiner—Stephen Choi
(74) Attorney, Agent, or Firm—Walter Ottesen

(57) ABSTRACT

The invention is directed to a cutterhead for a portable handheld brushcutter for cutting grass, weeds and the like. The cutterhead includes a housing which holds a spool for the cutting filament. Two spool chambers are formed on the periphery of the spool by a radial partition wall. A cutting filament is wound in each of the spool chambers and each of the cutting filaments is assigned an exit opening in the housing which extends into free space. The partition wall lies at the same axial elevation with the exit openings. The partition wall is provided with at least one lead-in channel through which the filament is guided into the interior of the spool when inserted. A reliable introduction of the filament is provided by a simple configuration of the cutterhead and makes a reliable wind-up and pay-out of the filament possible. This is achieved by providing a lead-in channel for each spool chamber with the entrance of the lead-in channel being defined by an insert funnel. The insert funnel is provided on each of the sides of the partition wall with a filament guide. Each side faces toward the assigned spool chamber. Furthermore, the lead-in channel extends non-linearly in the spool.

18 Claims, 10 Drawing Sheets

CUTTERHEAD FOR A PORTABLE HANDHELD BRUSHCUTTER

FIELD OF THE INVENTION

The invention relates to a cutterhead for a portable handheld brushcutter for cutting grass, weeds and the like.

BACKGROUND OF THE INVENTION

The cutterhead is mounted at the free end of a drive shaft which transfers the drive torque of a motor such as an internal combustion engine to the cutterhead. The cutterhead includes a pot-shaped housing having a housing hub extending toward the open end of the housing. The housing is held on the end portion of the drive shaft via the housing hub and is driven in rotation by the drive shaft. The housing includes a spool having a hub which is held on the housing hub coaxially to the drive shaft. A cutting filament is wound on the spool and has an end which extends into free space through an exit opening in a peripheral wall of the housing. The peripheral wall axially overlaps the spool. The cutting end of the cutting filament is radially accelerated about the rotating cutterhead during the operation of the brushcutter and cuts the plant matter in the vicinity of the cutterhead.

U.S. Pat. No. 5,671,536 discloses a cutterhead having a spool wherein two spool chambers are formed on the periphery in the spool by a radial partition wall. Cutting filaments are wound in each of the spool chambers. Each cutting end extending into free space is assigned an exit opening in the housing. The partition wall of the spool lies approximately at the same axial elevation as the exit opening and is provided with a lead-in channel through which the other filament end is guided into the interior of the spool and is there held friction tight. The winding up of the cutting filament on the spool should be possible without disassembly of the spool from the housing in that the end portion of the filament is guided through the lead-in channel through the interior of the spool. The lead-in channel is configured in the spool and opens into free space at the outer end face of the spool which is at the open end of the pot-shaped housing. The filament end which exits here should be bent over and inserted into an opening provided next to the channel opening in the end face of the spool. The replacement cutting filament is wound up after the insertion of the end by manual rotation of the spool chamber. An eccentric strut is formed at the exposed end face of the spool which is intended to facilitate the wind-up operation for the operator. The wound up cutting filament is held in a friction-tight manner and the remaining end is flung from the lead-in channel as a consequence of centrifugal forces when the complete length of filament is unwound.

The entrance of the lead-in channel in the partition wall overlaps, with its cross section, the entire exit opening in the housing to ensure that the replacement filament reaches the lead-in channel from the outside after being pushed through the exit opening. The lead-in channel defines a rise in at least one of the spool chambers on which the filament is wound. For the proper transport and discharge of the filament from the cutterhead, a uniformly arranged wind-up in the spool chambers is necessary in order to avoid an otherwise possible clamping of the filament layers lying disordered one next to the other. The known configuration of the lead-in channel, however, causes an asymmetry in the spool chambers which can lead to a nonuniform winding up of the filament. The inlet cross section of the lead-in channel is considerably larger than the diameter of the filament so that the replacement filament passes through the entrance cross section at any desired location in advance of winding up on the spool. For this reason, it cannot be precluded that the filament reaches the incorrect spool chamber at the start of the wind-up operation in which incorrect spool chamber an already wound up filament could possibly be disposed. Increased attention of the operator and additional manipulation of the filament and the cutterhead are required in order to allocate the filament to be wound to the appropriate spool chamber. In this way, the filament can be directed into the spool in the required direction.

SUMMARY OF THE INVENTION

It is an object of the invention to simplify the configuration of the cutterhead as well as to make a reliable introduction of the replacement filament possible into the cutterhead and to make possible a wind-up and pay-out as needed.

The cutterhead of the invention is for a portable handheld brushcutter having a drive shaft defining a drive axis about which the cutterhead is rotatably driven. The cutterhead is mounted on the free end of the drive shaft and includes: a pot-shaped housing having an open end and having a housing hub formed inside the housing and extending to the open end thereof; the pot-shaped housing being held on the end portion of the drive shaft with the housing hub so as to permit the housing to be driven by the drive shaft; a spool accommodated in the housing and having a spool hub held on the housing hub; the spool having a radial partition wall extending about the periphery thereof to form first and second spool chambers; the spool chambers being adapted to contain respective cutting filaments and each of the cutting filaments having first and second ends; the pot-shaped housing having a peripheral wall axially surrounding the spool; the pot-shaped housing having two exit openings formed in the peripheral wall through which corresponding ones of the cutting filaments extend into free space with their first ends; the partition wall lying at the same axial elevation as the exit openings; the partition wall defining a plane transverse to the axis and having first and second lead-in channels formed therein corresponding to the first and second spool chambers, respectively; each of the lead-in channels being provided for guiding in the second end of the cutting filament into the interior of the spool chamber corresponding thereto; the first and second lead-in channels having respective entrances configured as first and second insert funnels, respectively, tapered in the lead-in direction; the plane having a first side facing toward the first spool chamber and a second side facing toward the second spool chamber; each of the insert funnels having a funnel wall defining the insert funnel and having a filament guide formed thereon; the filament guide of the first insert funnel being defined by a radially shortened section of the wall of the first insert funnel disposed on the first side of the plane; the filament guide of the second insert funnel being defined by a radially shortened section of the wall of the second insert funnel disposed on the second side of the plane; and, the first and second lead-in channels extending nonlinearly in the spool.

At least one lead-in channel is provided per spool chamber. The entrance of the lead-in channel is configured as a tapered insert funnel in the insert direction of the filament. The insert funnel overlaps the exit opening in the housing with a large entry cross section. The introduced replacement filament is centered by the funnel and is insertable into the space-saving tapered lead-in channel. The lead-in channel extends nonlinearly in the spool whereby the filament lies against the channel wall over large segments and is held in a friction-tight manner when pulled. The insert funnels are on respective sides of a plane of the partition wall which lies facing toward the corresponding one of the spool chambers. The insert funnels are provided with a filament guide which is formed by a radially shorter wall section of the insert funnel. After the replacement filament is attached via the lead-in channel in the spool housing, the filament is forced by the filament guide into the intended spool chamber during the subsequent wind-up operation.

The lead-in channel is configured so as to be bent at at least one location with an inner-lying edge in the direction of the bend. During the wind-up operation, the filament is held by pull forces at the sharp-edged bend of the lead-in channel. This is so especially when the cross section of the lead-in channel is only slightly greater than the diameter of the filament. The lead-in channel advantageously includes a first essentially radial segment directly after the insert funnel and a second axial segment bent over with a sharp edge. The axial segment has a larger clear cross-sectional area than the radial segment so that the filament can be pushed through the bend during insertion without a bend being formed in the filament and can be taken up in the axial segment. To achieve a reliable guidance of the filament in the region of the bend, the wall section of the lead-in channel has such an arcuate-shaped course that the filament end, which is introduced radially into the channel, strikes the wall section at an obtuse angle. This wall section is an outer-lying wall section in the direction of the bend. Even when the wall section of the lead-in channel is configured so as to be inclined to the orthogonal radial and axial channel segments, the filament end, which strikes the channel wall in the region of the bend, can be pushed further in the axial segment without being impeded. In a preferred embodiment of the invention, the lead-in channel is bent in the direction of the closed housing end whereby a stop for the inserted filament end is formed by the adjacent-lying housing for an open configuration of the axial channel segment.

During operation of the brushcutter, the filament is payed out in segments from the spool in order to always make available an effective cutting filament of the necessary length outside of the housing. An indexing device is provided between the driving assembly (drive shaft/housing) and the spool in order to provide a pay-out of the filament as required. The indexing device has an indexing member which entrains the spool in a form-tight manner and, when the indexing device is actuated against the return force of a spring, the spool can be moved out of the drive engagement. When the indexing device is actuated, the spool is decoupled from the drive and, because of the relative displacement, which occurs between the driving assembly and the drivable spool, a pay-out of the filament results. The length of the filament pushed out of the housing during the pay-out operation results from the arc angle which the spool passes through until a renewed form-tight engagement of the indexing member in a corresponding entrainment means. Advantageously, several pairs of lead-in channels are provided in the partition wall for each of the two spool chambers and the pairs are arranged rotationally symmetrically with respect to each other. A channel pair is rotated to overlap with the exit openings with each pay-out between two latch positions. Three or more pairs of lead-in channels are especially advantageously provided. The lead-in channels of both spool chambers are arranged alternately on the periphery of the spool. The spool is rotated further during the pay-out operation by twice the arc angle between mutually adjacent lead-in channels relative to the housing whereby, in each possible operating position, channels having filament guides for the same spool chamber always lie opposite the exit openings in the housing. The incorrect wind-up of a replacement filament in the incorrect spool chamber is thereby precluded.

The indexing member advantageously coacts with an indexing gate. At least one of the components is configured to have a ratchet-like configuration with a ramp falling in the pay-out rotational direction of the spool to the latch position. In normal operation, the indexing member is pressed against the abutment formed by the tooth and entrains the indexing gate or, more specifically, the component having the indexing gate.

In the opposite rotational direction, the entrainment connection between the indexing member and the indexing gate is decoupled and a wind-up of the filament on the spool is possible any time. During the relative movement between the spool and the housing during the wind-up operation, the indexing member is pushed from the ramp and brought into the latch position at the end of the ramp path by the return spring.

In an advantageous further embodiment of the invention, the indexing member includes several indexing teeth which are arranged about the rotational axis of the cutterhead in correspondence to the arc angle between the sequential latch positions and therefore the filament length outputted during a pay-out operation. The indexing gate includes indexing blocks arranged in corresponding spacing and number which are in operative connection with corresponding ones of the indexing teeth. For each index position, the spool has an indexing member tooth/indexing gate block pair which is assigned a pair of the lead-in channels whose insert funnels are provided with differently directed filament guides. A lead-in channel pair lies in overlapment with the exit openings in the housing for each assigned latch position. For each pay-out operation of the filament, the indexing device rotates the spool relative to the housing by one latch position further whereby each indexing member tooth is brought into entrainment contact on the indexing gate tooth which follows in the drive rotational direction of the spool.

Advantageously, the indexing gate has a stop for the indexing member rotating in the deflection position whereby it is precluded that the indexing member runs beyond each next latch position and outputs too great a filament length. A stop is provided for each indexing tooth and latch position. The stop lies in a parallel plane to the plane of the latch positions of the indexing teeth. The stop lies outside of the region of movement of the indexing member along the ramp and does not affect the movement of the indexing member during the wind-up operation when the indexing member is held away from the stop by the return spring. It is seen to be advantageous when the indexing gate is configured in the interior space of the spool and the spool is thereby rotatably moved and mounted axially fixed in the housing of the cutterhead.

BRIEF DESCRIPTION OF THE DRAWINGS

The invention will now be described with reference to the drawings wherein:

FIG. 11b is a schematic showing the operation of the indexing device of the cutterhead of FIG. 10a;

FIG. 13a is a schematic of still another embodiment of the cutterhead according to the invention; and, FIG. 13b is a section view showing the indexing device of the cutterhead of FIG. 13a.

DESCRIPTION OF THE PREFERRED EMBODIMENTS OF THE INVENTION

Figure 1:
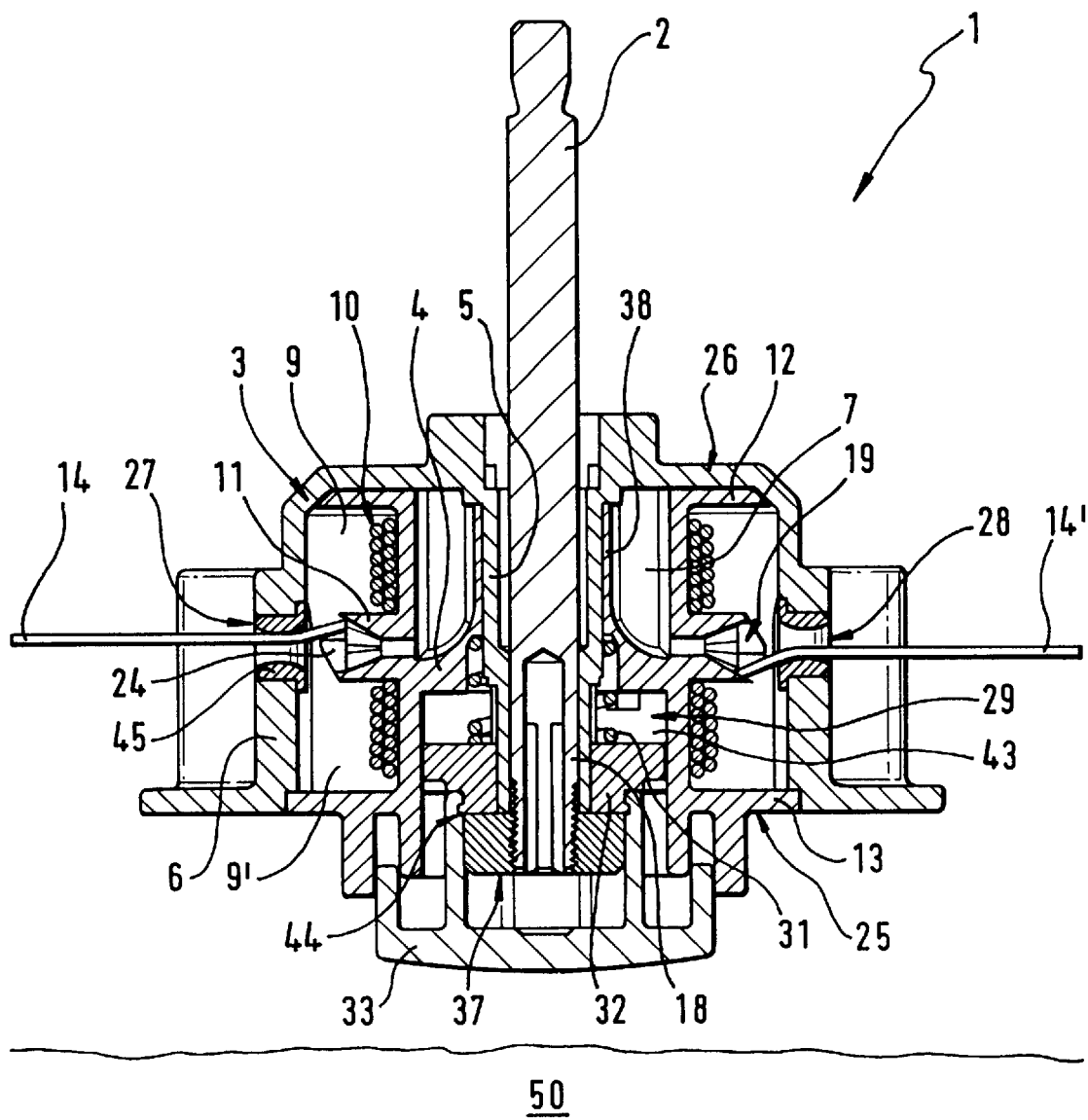
FIG. 1 is a side elevation view, in section, of a cutterhead according to the invention equipped with a bump button.

FIG. 1 shows a cutterhead 1, in longitudinal section, of a portable handheld brushcutter (not shown) for cutting grass, weeds and the like. The cutterhead 1 is mounted on the free end of a drive shaft 2 of the brushcutter. At the other end of the drive shaft, a drive unit of the brushcutter is attached to the drive shaft so that the drive shaft rotates therewith. The drive unit can, for example, be an internal combustion engine.

The cutterhead includes a pot-shaped housing 3 which is connected to the drive shaft 2 so as to rotate therewith. The housing 3 is configured so as to be substantially rotationally symmetrical and has two diametrically opposite exit openings (27, 28) in its peripheral wall 6. The cutting end portions (14, 14') of cutting filaments 10 extend into free space through respective ones of the openings (27, 28). When the cutterhead is driven in rotation, the cutting ends (14, 14') are accelerated and extend radially because of the occurring centrifugal forces. The cutterhead 1 is moved back and forth close to the ground surface 50 to be mowed and the plant matter on the ground 50 is cut back in the region of accessibility of the cutting ends (14, 14').

The housing 3 is provided with a housing hub 5 extending toward the open end 25. The housing 3 is attached with the housing hub 5 to the shaft end 18 of the drive shaft 2 and is held so that it can be rotatably driven. The housing 3 includes a spool 4 on which a supply of cutting filament 10 is wound. The cutting filament 10 can, as required, be unwound from the spool 4 in order to make, at any time, an effective cutting end portion 14 available having the optimal length and to replace filament ends (14, 14') which are shortened because of wear during operation of the brushcutter. The spool 4 is supported with its hub 38 on the housing hub 5 and is entrained during cutting operation by the driving assembly (drive shaft 2/housing 3). The form-tight drive connection of the spool 4 can be disengaged by an indexing device 29 which will be explained in greater detail with respect to FIGS. 2 and 4. With the indexing device, the cutting filament 10 is unwound from the spool.

A relative displacement results between the housing 3, which continues to be driven, and the spool 4 rotatable about the axis of the hub 38 in order to unwind cutting filament. The indexing device is actuated by a bump button 33 of the cutterhead 1. The bump button projects from the open end 25 of the housing 3 and is brought into contact with the ground surface 50 to be mowed for the purpose of paying out the filament. The bump button 33 is pressable into the housing 3 and disables the drive connection of the spool 4. After the cutterhead 1 is lifted from the ground 50, the bump button 33 is returned to its initial position by a helical spring 31 and the drive connection of the spool 4 is simultaneously restored.

The end faces (12, 13) of the spool 4 extend over the periphery with the outer-lying end face 13 lying in the opening 25 of the housing 3 and closing the latter. Two coil chambers (9, 9') are delimited on the periphery of the spool 4 by a radial partition wall 11. Cutting filaments 10 are wound in each of the coil chambers (9, 9') and these cutting filaments extend into free space through exit openings (27, 28) in the peripheral wall 6 of the housing 3. The exit openings (27, 28) are assigned to respective ones of the spool chambers (9, 9'). The cutterhead is configured so as to be rotationally symmetrical. The exit openings (27, 28) lie diametrically opposite each other in the housing 3. As shown especially in FIG. 2, guide bushings 45 for the cutting filament are pressed into respective ones of the exit openings in the housing 3.

Several lead-in channels (7, 8) are formed in the partition wall 11 and are spaced uniformly from each other. The pairs of lead-in channels are brought into overlapment with the exit openings in the operating position of the indexing device 29. Through one of the rotationally-symmetrically lying pairs of lead-in channels (7, 8), the filament ends are introduced into the interior of the spool 4 before the filament is wound. The lead-in channels (7, 8) in the spool 4 are not configured so as to extend in a straight line. Accordingly, the filament is held friction tight in the particular lead-in channel (7, 8). The inlet of the lead-in channels (7, 8) is configured as an insert funnel 19 tapered in the lead-in direction of the filament 10. The insert funnel 19 overlaps the exit openings (27, 28) and leads the filament 10 into the lead-in channels which, themselves, have a considerably smaller diameter than the edge of the funnel.

Figure 8:
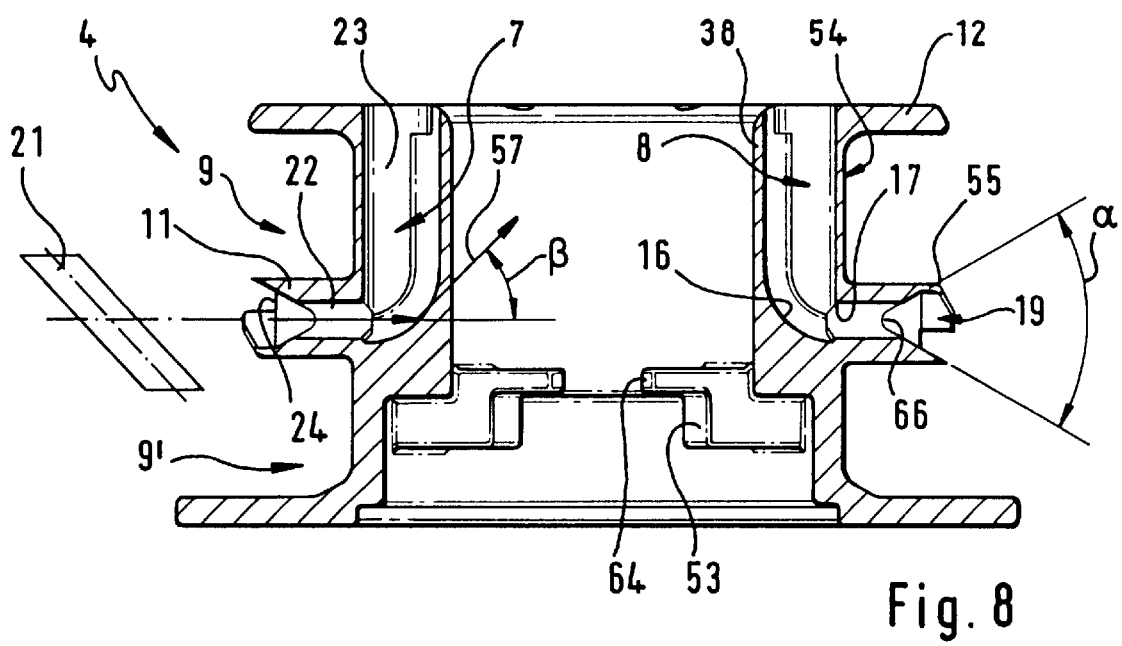
FIG. 8 is a side elevation view of a spool, in longitudinal section.

The lead-in channels (7, 8) are described in greater detail below with respect to FIG. 8.

The insert funnels 19 of the lead-in channels are provided with filament guides 24 which guide the cutting filament, which exits from the lead-in channels, to the particular spool chamber 9 during wind-up of the spool 4. The filament guides 24 are formed by a radially shorter wall section of the insert funnel 19 on the particular side of a plane 21 of the partition wall 11. This side of the plane 21 faces toward the assigned spool chamber 9. For the paired diametrically opposite-lying lead-in channels (7, 8), the filament guides 24 are formed on different sides of the plane 21 of the partition wall 11 whereby the filament is thrust into a particular one of the two spool chambers 9 when winding up the spool and are reliably wound. The edge 55 of the insert funnel 19 is drawn inwardly in its section 66 lying laterally in the peripheral direction of the spool 4 whereby the insert funnel 19 does not affect the filament segment extending through the exit opening during indexing and spooling. The edge section 66 is delimited approximately by a planar conical section of the funnel cone and is therefore approximately of parabolic shape. The apex of the parabola lies in the center of the insert channel (7, 8) and defines a rounded out filament outlet. The funnel opening angle α is advantageously so selected that the filament, which is to be payed out of the spool chambers 9, is guided at an angle of approximately 30° to the exit opening in the housing.

Figure 5:
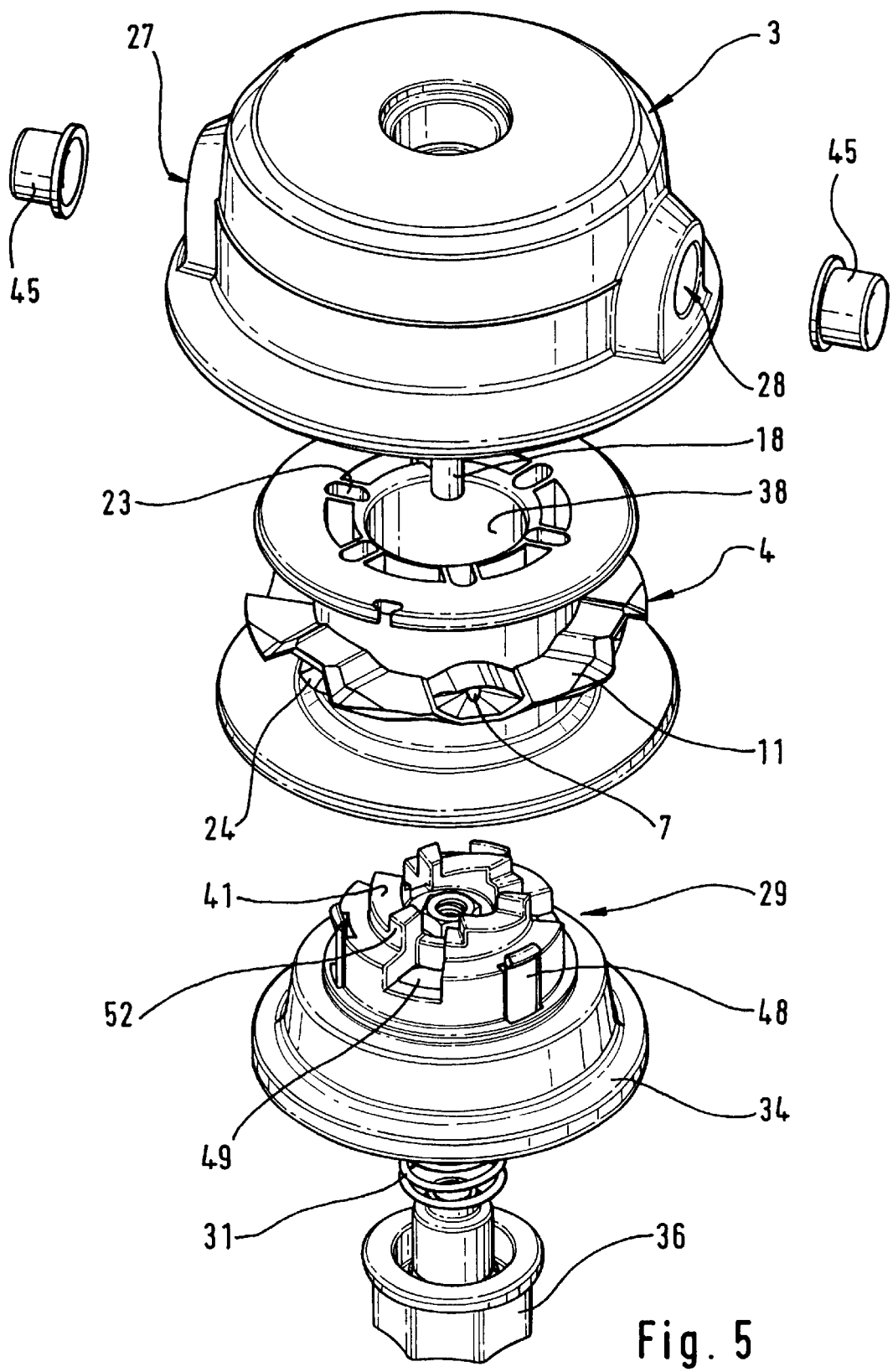
FIG. 5 is an exploded view of a cutterhead having a wind-up handle.

The lead-in channels (7, 8) each include a first radial segment 22, which extends directly from the insert funnel 19, and a second axial segment 23. The radial segment 22 extends through the partition wall 11. The axial segment 23 is formed in the body of spool 4 between the hub 38 and the peripheral spool wall 54 on which the cutting filament is wound in the spool chambers 9. The axial segment 23 is angled from the radial channel section in the direction of the end face 12 of the spool 4. End face 12 lies toward the inside when the spool 4 is disposed in the housing. A stop for the filament being inserted is formed at the end of the lead-in channels. In an open configuration of the lead-in channels (7, 8), the axial channel segment 23 breaks through the end face 12 of the spool 4 as shown in FIG. 5. For such an open configuration of the lead-in channels (7, 8), the stop is closed by the closed end (reference numeral 26 in FIG. 1) of the housing 3. The lead-in channels (7, 8) are bent with sharp edges and the edge 17 (FIG. 8) holds the introduced filament in the lead-in channel in a friction-tight manner. The edge 17 lies inwardly in the bent direction.

The wall section 16 of the lead-in channel (7, 8), which lies outside in the direction of the bend, extends arcuately in order to ensure a reliable introduction of the filament into the channels (7, 8) with low insert forces. The radial filament end is introduced into the lead-in channel (7, 8) in the direction of arrow 57. This filament end then strikes against the arc-shaped wall section 16 at an obtuse angle and is redirected automatically into the next axial channel segment 23. The radius of the arc 16 is so selected that an obtuse deflection angle (180°–β) is formed between the circle tangent at the point of incidence in the arc 16 and the radial lead-in direction of the filament. In lieu of the arcuate form, the wall section 16, which lies outwardly in the bend direction, can also be configured as an inclined ramp in order to achieve the obtuse angular bend of the elastic filament in the direction of arrow 57.

The radial cross-sectional diameter of the axial channel segment 23 permits a resistance-free introduction of the filament and is to be selected so narrow (while considering the material characteristics of the filament) that the filament is bent in such a manner about the inner-lying edge 17 that the filament is held friction tight because of its elastic reset action. Filaments of different filament thickness can be accommodated in the lead-in channels (7, 8) configured in accordance with the invention. Thicker filaments having larger cross-sectional areas are already held in the radial channel segment 22 by the friction forces between the filament surface and the channel wall; whereas, even thin filaments are held by the right-angular turn in the axial channel segment 23 via the inner-lying channel edge 17. For this reason, even different filaments can be used with the filament cutterhead especially with different filament diameters.

As shown in FIG. 1, the edge of the insert funnel 19 extends up to close to the peripheral wall 6 of the cutterhead housing 3. The opening to the particular spool chamber (9, 9') is formed by the filament guide and an unwanted introduction of a filament layer into the other spool chamber is precluded. The diameters of the insert funnels 19 are extended in the peripheral direction of the partition wall 11 (see FIGS. 2 and 5). Excellent exit angles of the wound filament from the spool chambers (9, 9') and the exit openings (27, 28) in the cutterhead housing 3 are achieved with these somewhat elliptical funnel cross sections.

To pay-out of the filament 10 from the spool 4 and to lengthen the cutting end portion exiting from the housing 3, the spool 4 is rotated relative to housing 3 and the channel pair, which is provided next in the direction of rotation, is brought into overlapment with corresponding exit openings (27, 28). An indexing device 29 is provided for the further pay-out of the spool 4 between the driven assembly (drive shaft 2/housing 3) and the spool 4. The indexing member 32 of the indexing device 29 entrains the spool 4 in a form-tight manner.

When actuating the indexing device 29 by pressing in the bump button 33 into the housing 3, the indexing member 32 is moved out of the drive engagement against the return force of the helical spring 31. The helical spring 31 concentrically surrounds the drive shaft 2 and, on the one hand, is supported at the spool 4 while, on the other hand, it is supported on the end face of the indexing member 32 annularly surrounding the drive shaft 2. The indexing member 32 is axially secured by a hexagonal nut 37 threadably engaged on the drive end portion 18. The indexing member 32 is axially movable in the interior space 43 of the spool 4 and coacts with an indexing gate projecting from the wall defining the interior space 43. The indexing gate initiates the pay-out rotational movement of the spool 4 relative to the housing 3 when there is an axial movement of the indexing member. The interior space 43 and the shaft end 18 with the indexing member 32 held thereon are covered by the bump button 33. The axially movable bump button 33 is latched to the indexing member 32 via a snap connection 44.

The arrangement of the lead-in channels (7, 8) will be explained in greater detail with respect to FIGS. 3a and 3b.

Figure 3A:
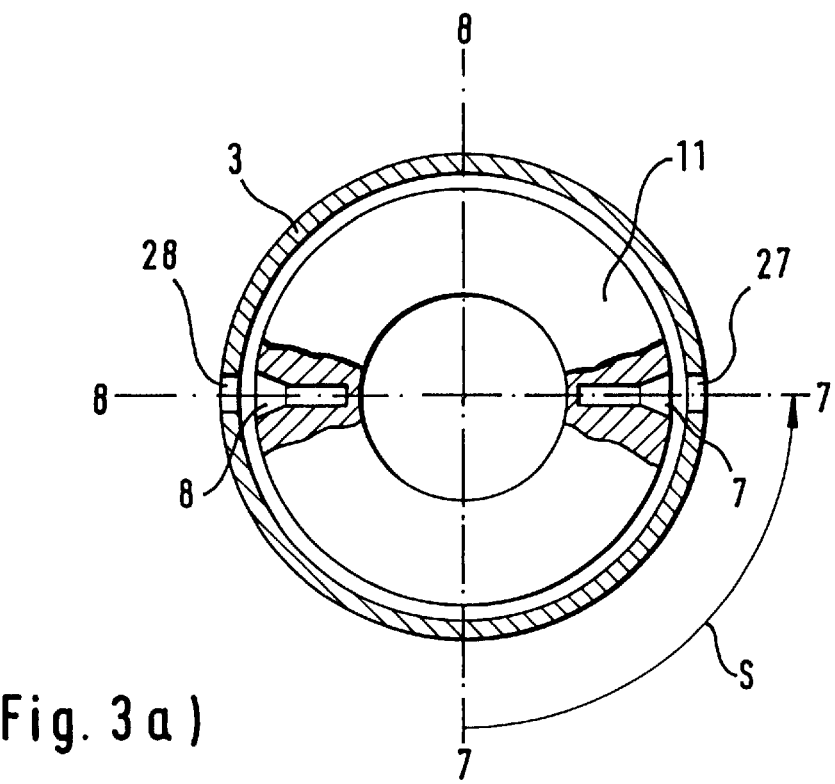
FIG. 3a is a cross section of a cutterhead at the elevation of the radial partition wall of the spool wherein only one pair of lead-in channels is provided.

A cross section through the housing 3 at the axial elevation of the partition wall 11 of the spool is shown in FIG. 3a. In the operating position of the cutterhead, the insert funnels of the lead-in channels (7, 8) lie opposite the exit openings (27, 28) in the housing 3. As already described, the insert funnels of the channels (7, 8) provide guides to respective ones of the spool chambers on the spool. The channels (7, 8) lie in overlapment with corresponding ones of the exit openings (27, 28).

In the embodiment of FIG. 3a, four lead-in channels are provided which lie in pairs diametrically opposite correspondingly differently directed filament guides. The lead-in channels (7, 8) are uniformly spaced from each other on the periphery of the spool. During a pay-out operation, the indexing device, which is moved out of the drive engagement, permits a relative displacement of the lead-in channels relative to the housing 3 by the arc angle lying between two mutually adjacent channels. This arc angle is 90° in the embodiment shown having four lead-in channels.

Figure 3B:
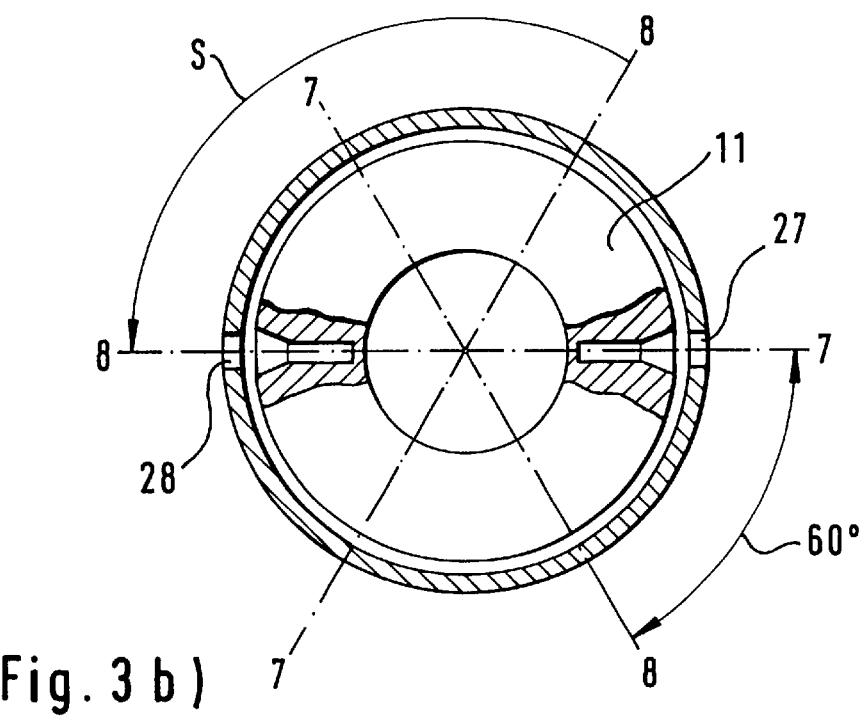
FIG. 3b is a cross section of a cutterhead at the elevation of the radial partition wall of the spool wherein the cutterhead is equipped with three pairs of lead-in channels.

Three or more pairs of lead-in channels (7, 8) are especially advantageous as shown in FIG. 3b where an example of six lead-in channels (7, 8) is shown. The lead-in channels (7, 8) of the two spool chambers are alternately arranged on the periphery of the spool. Lead-in channels (7, 8) with the differently directed spool chambers lie spaced from each other by an arc angle of 60°. The indexing member of the indexing device is so configured that, for an indexing operation for paying out the filament, a rotation of the spool by two arc sectors is carried out. These arc sectors are defined by the mutually adjacently lying channel pairs on the periphery of the spool.

In the embodiment shown with six lead-in channels (7, 8) (that is, three channel pairs), the spool is moved in a pay-out operation by the pay-out path S of 120° whereby each of the exit openings (27, 28) always lies opposite the corresponding lead-in channels (7, 8) assigned to the same spool chamber. With the alternating arrangement of the lead-in channels (7, 8) on the periphery of the spool, a configuration of the insert funnel is possible which is simplified compared to the arrangement and the indexing operation according to FIG. 3a. Measures are not needed for a reliable allocation of the replacement filament when winding up in the intended spool chamber while simultaneously ensuring a friction-free filament pay out without affecting the filament segment extending through the funnel and the exit opening.

Figure 2:
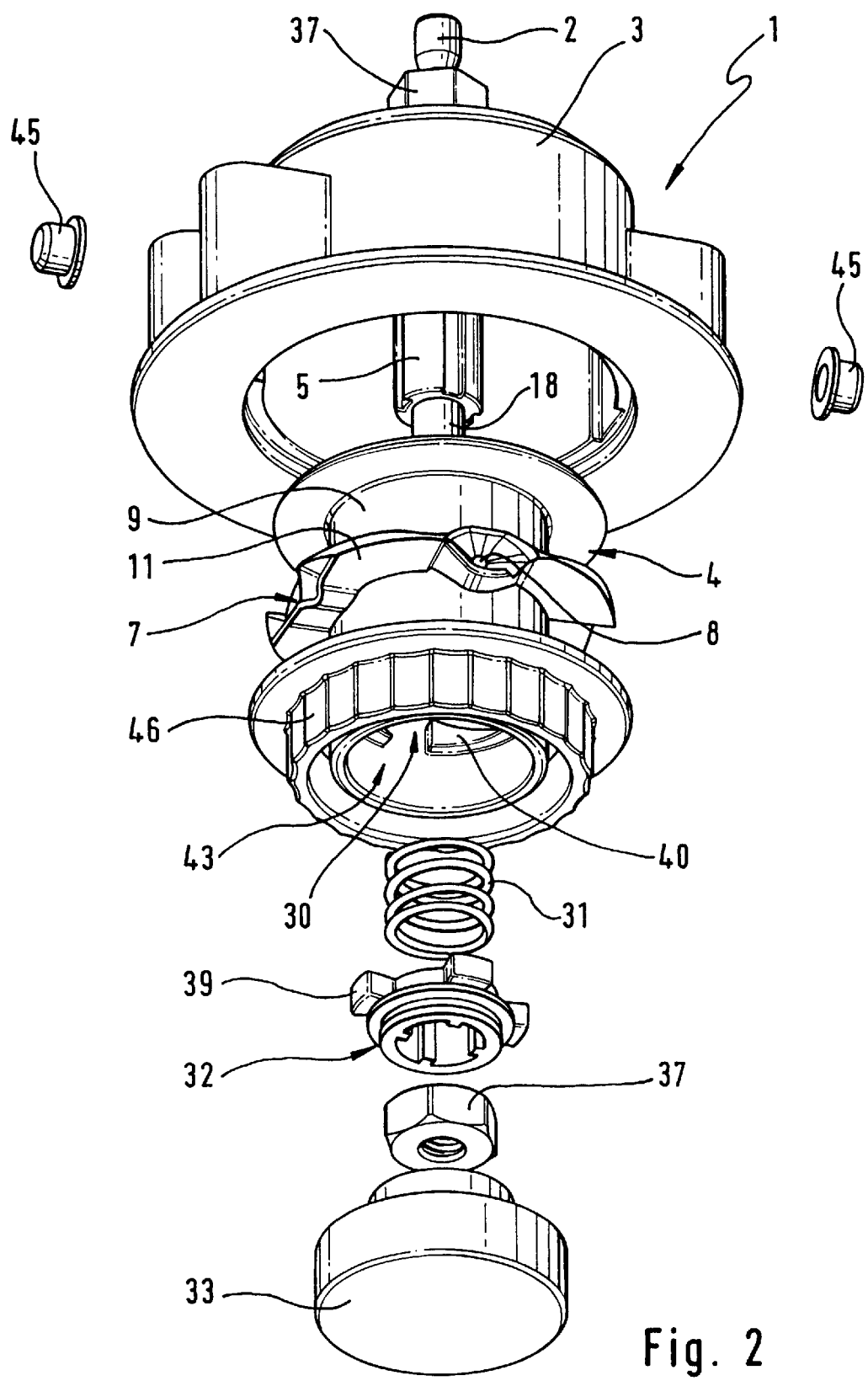
FIG. 2 is an exploded view of the cutterhead of FIG. 1.

FIG. 2 shows an exploded view of the cutterhead 1 of FIG. 1 wherein the same reference numerals are used for like component parts. The indexing member 32 is driven with the housing 3 by the drive shaft 2 and is held so as to be displaceable axially on the housing hub 5 of the housing 3 for the further indexing of the spool 4 to pay out the filament. The indexing member 32 is formed to have an annular shape and has slide keys in its interior space which are guided in axial slots formed on the housing hub 5. A hexagonal nut 37 is threadably engaged up to the contact at the housing hub 5 on the shaft end section 18 of the drive shaft 2 and defines a stop shoulder for the axially displaceable indexing member 32 which is in the form of an indexing ring as shown. A further hexagonal nut 37 axially fixes the cutterhead 1 on the drive shaft 2 outside of the pot-shaped housing 3.

The indexing member 32 has four uniformly spaced indexing teeth 39 on its periphery. These teeth coact with a corresponding number of ratchet teeth 40 of the indexing gate 30 in the spool 4. The radial ends of the indexing teeth 39 reach up to close to the inner wall of the spool 4. The ratchet teeth 40 project from the spool 4 in the same number as the indexing teeth 39 and in the same angular position corresponding to the latching positions. The ratchet teeth 40 are configured to be ramp-shaped and, in the latch position of the indexing device, lie in respective intermediate spaces defined by the indexing teeth 39. In this position, the driven indexing member 32 form-tightly entrains the spool 4 via the contact of its indexing teeth 39 against the ratchet teeth 40.

When the bump button 33 is pressed axially into the housing 3, the indexing member 32 is axially displaced relative to the spool 4 and the indexing gate 30 formed on the spool and the indexing teeth 39 are moved out of engagement with the ratchet teeth 40.

Figure 4:
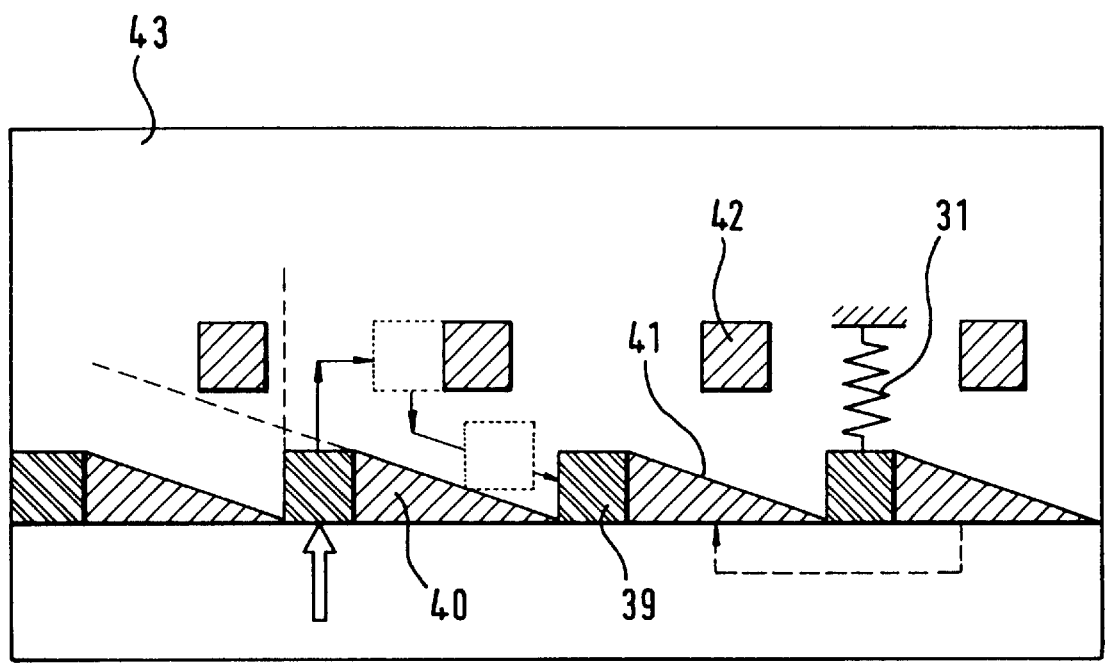
FIG. 4 is a schematic showing the operation of the indexing device.
Figure 4:
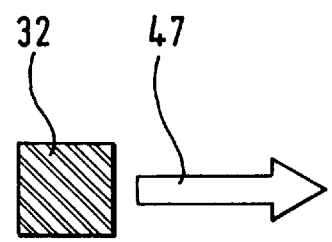
Figure 4:
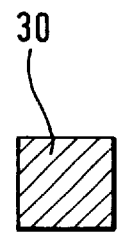

FIG. 4 is a schematic which shows the operation of the indexing device.

The driven indexing teeth 39 of the indexing member 32 are coupled to the drive shaft and are shown double hatched. The drivable elements of the indexing gate 30 in the interior space 43 of the spool 4 are identified by simple hatching. The indexing teeth 39 are here shown in the latched position. The indexing teeth 39 lie against corresponding ones of the axial entraining faces of the ratchet teeth 40 and entrain these ratchet teeth in the direction of arrow 47 during driving. The ratchet teeth 40 are ramp shaped and are formed with a ramp 41 falling off in the drive rotational direction 47. The form-tight drive engagement of the indexing teeth 39 in the intermediate spaces defined by the ratchet teeth 40 can be released by axially displacing the indexing member 32 against the return force of the helical spring 31. Without an external force, the indexing teeth 39 are held by the helical spring 31 in the latch position. The ramps 41 of the ratchet teeth 40 make it possible to easily wind up a replacement filament on the spool. The ramp surfaces 41 engage behind the neighboring indexing teeth 39 during a corresponding rotational movement of the spool. With a further rotation of the spool to wind up the replacement filament, the indexing teeth 39 slide upwardly on the ramps 41 and are pressed into the latch position lying forward in the rotational direction. The spool is also moved in the direction of arrow 47 when winding up a replacement filament and a section of the spool, which projects from the housing, is formed thereon as a knurled handle for the operator. The knurled handle is identified by reference numeral 46 in FIG. 2.

The drive of the indexing gate 30 is disengaged when the indexing teeth 39 become disengaged from the ratchet teeth 40 because of an axial displacement with the actuation of the indexing device. Then, a relative shift between the spool and the driven components occurs. The ratchet teeth 40 are then displaced in the direction of the arrow shown in phantom outline in FIG. 4. The indexing gate 30 includes a stop for the indexing teeth 39 which rotate in the deflected position in order to ensure that the ratchet teeth assume the position of the next adjacent ratchet teeth in the indexing direction during a pay-out indexing operation and the indexing teeth 39 are brought into the next possible latch position. A stop block 42 is provided per latch position. The stop blocks 42 lie outside of the region of movement of the indexing member 32 along the ramp 41 with the movement region being shown in phantom outline. In a wind-up operation, the indexing teeth 39 are passed under the stop blocks 42. The stop locks 42 are arranged at the same arc spacing as the indexing teeth 39 and the ratchet teeth 40.

During an indexing operation, the indexing teeth 39 are pressed against the return spring 31 into the deflected position. In this position, the stop blocks 42 limit the possible relative movement between the spool and the driving component assembly. During the contact of the stop blocks against the relative-movable indexing teeth 39, which have come to standstill, these indexing teeth are pressed by the helical spring 31 toward the axial next-adjacent ramp 41 of the ratchet tooth 40 following in the drive direction 47. After the helical spring 31 has moved the indexing teeth 39 out of overlapment with the stop blocks 42 in the rotational direction, a further relative shift between the driving and the driven components takes place and the indexing teeth 39 come into contact against the ramp surface 41 of the ratchet tooth provided for the next-following latch position.

FIG. 5 is an exploded view of a cutterhead having an indexing device for paying out the filament wherein the entraining ratchet teeth 52 are formed on an axially indexing movable handle 34. The ratchet teeth 52 each have a ramp 41 falling in the drive rotational direction. The handle 34 is braced axially by a helical spring 31 against an end nut 36 and is movable out of the latch position by an axial movement to drive the spool 4. The same components of this cutterhead have the same reference numerals as those in the cutterhead shown in FIGS. 1 and 2.

Figure 6:
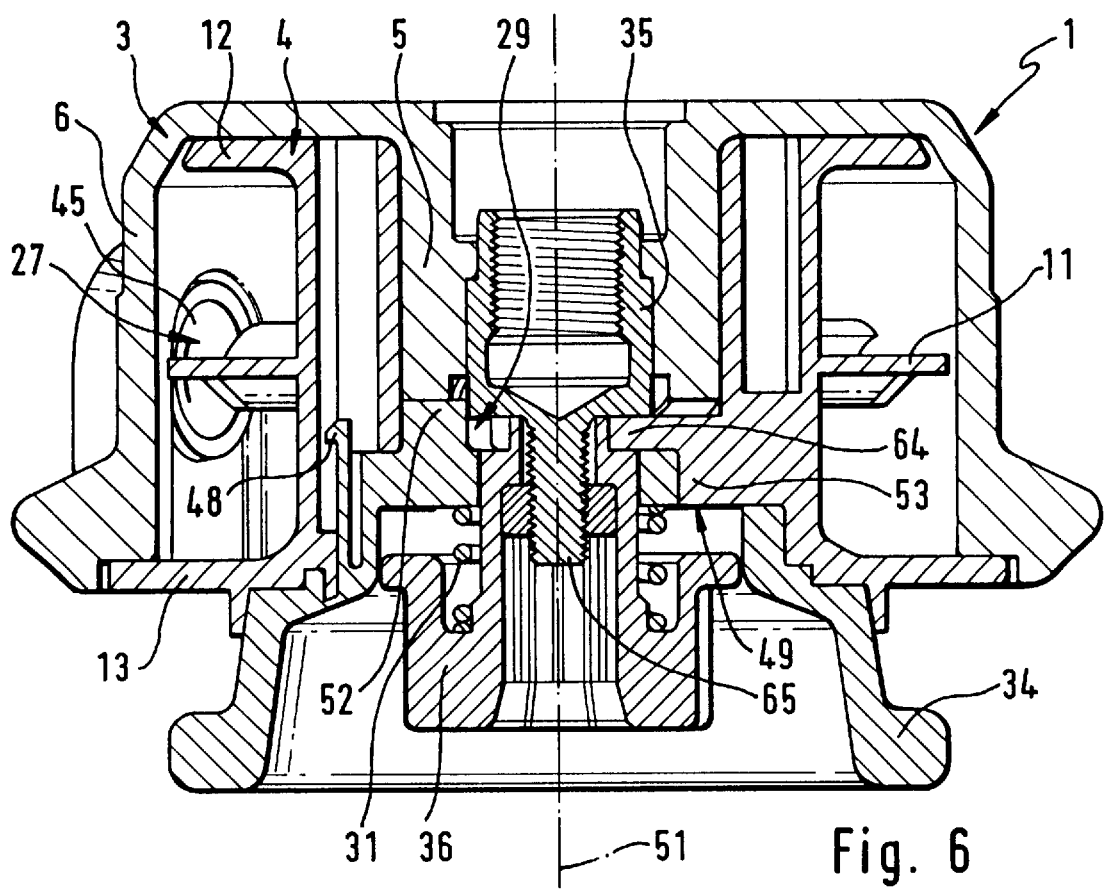
FIG. 6 is a side elevation view, in longitudinal section, of the cutterhead of FIG. 5.

For winding up a replacement filament on the spool 4, the handle 34 is rotated and the ramps 41 of the entraining ratchet teeth 52 make possible a movement of the spool 4 relative to the housing 3. The axial decoupling path of the handle 34 is limited by the hook stops 48 which coact with corresponding shoulders in the interior space of the spool 4. In this connection, reference can be made to the cross-sectional view of the cutterhead 1 in FIG. 6. The indexing device 29 is configured in the socket section of the handle 34 which projects into the spool 4. Recesses 49 are provided as a form-tight entrainment connection between the driven handle 34 and the spool 4. In the latched position of the indexing device 29, lugs 53 engage in the recesses 49 in the handle base in the same angular position. The lugs 53 are arranged in the interior space of the spool and are shown in FIGS. 6 and 8. With an axial movement of the handle 34 for paying out from the spool 4, the lugs 53 are pushed out of the drive engagement into the recesses 49 and the relative movement between the housing 3 and the spool 4 including the handle 34 is made possible.

As shown in FIG. 6, the end nut 36 is rigidly connected to the housing 3 of the cutterhead 1. The axially movable handle 34 is braced against the end nut 36 via the helical spring 31. In the central housing hub 5 of the housing 3, a fixing screw 35 is pressed in concentrically with the rotational axis 51 of the cutterhead 1. The fixing screw 35 includes a tip receptacle into which the drive shaft of the brushcutter can be threadably engaged. An inwardly drawn collar 64 is formed on the spool 4 in the region of the lugs 53. This collar lies against the corresponding shoulder of the end nut 36. The cutterhead 1 can be assembled in a simple manner with components which are introduced sequentially into the housing 3. First, the spool 4 with the tightened fixing screw 35 is set into the pot-shaped housing 3. The fixing screw 35 has a threaded tip 65 extending through the collar 64. After the end nut 36 is joined to the rotational handle 34 with the helical spring 31 inserted therebetween, the end nut 36 is placed on the threaded tip 65 of the fixing screw 35 and is secured by a hexagonal nut. In the embodiment shown, three latch positions of the indexing device 29 are provided. In the cross-sectional view shown, one of the three entraining ratchet teeth 52 can be seen to the left of the rotational axis 51 and this ratchet tooth engages in the housing 3. The collar 64 can be seen to the right of the rotational axis 51. The collar 64 is rotatable with guide play between the components (fixing screw 35/end nut 36) lying next to each other.

The cutterhead 1 shown includes six filament lead-in channels in the partition wall 11 of the spool 4 and these lead-in channels are rotated further by one position during a pay-out operation of the filament.

Figure 7:
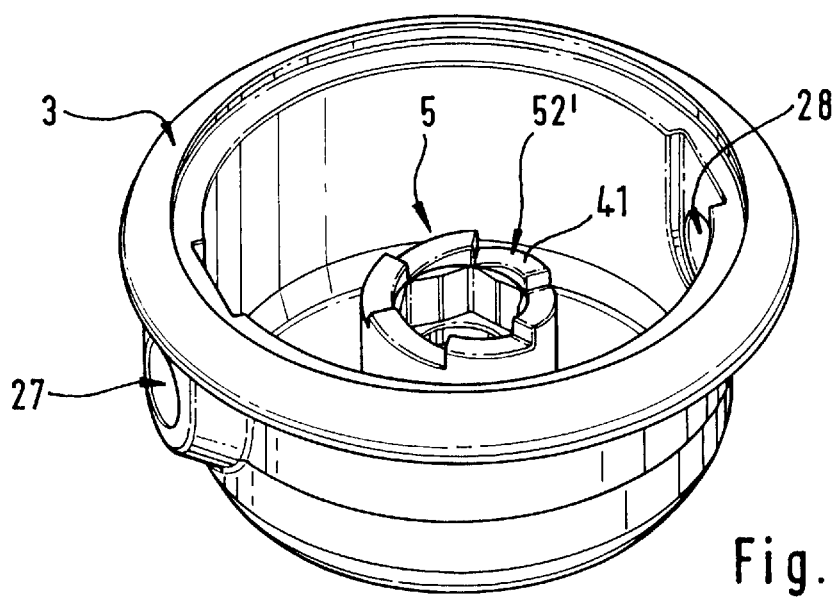
FIG. 7 is a perspective view of the housing of the cutterhead of FIGS. 5 and 6.

FIG. 7 shows the housing 3 in a perspective view from the open end. The housing hub 5 can be seen in the interior of the housing 3. The housing hub 5 has an end face which coacts with the rotational handle 34 (FIG. 6). The housing hub 5 is provided with six ratchet teeth 52' distributed uniformly on the periphery. The ratchet teeth 52' have ramps 41 falling in the drive direction and make possible the drive and unwind operation described with respect to FIG. 4 between the driven and the driving components. For a wind-up operation, the ramps 41 bring the lugs 53 of the spool 4 out of the axial form-tight engagement in the recesses 49 in the rotational handle 34. In this embodiment of the cutterhead of the invention, the drive of the spool 4 takes place via the rotational handle 34 which includes the indexing device. For pushing out the filament, the handle 34 is pulled by the operator of the brushcutter and, in this way, the drive connection is disabled against the return spring.

Figure 9:
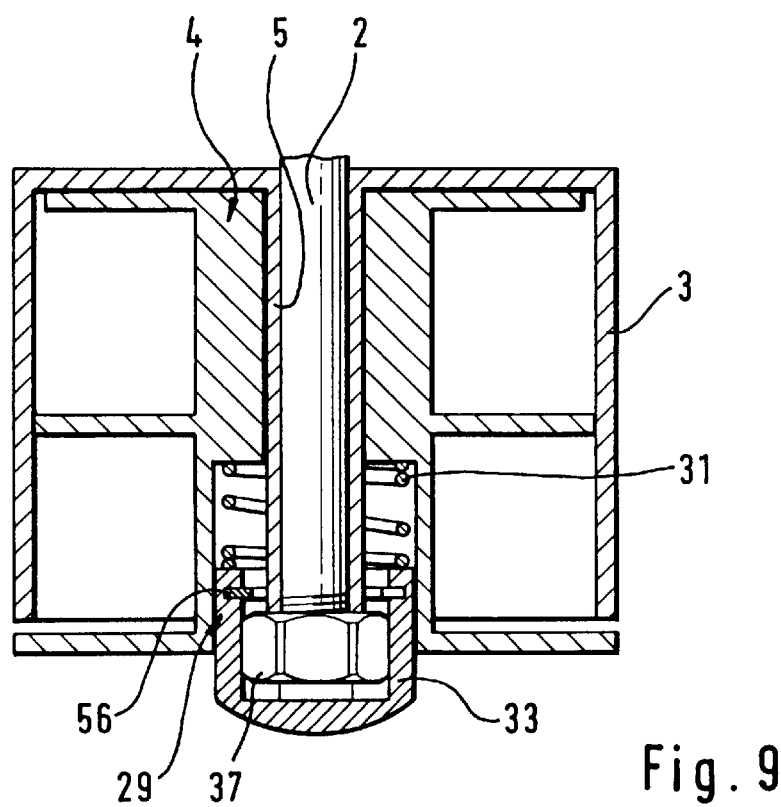
FIG. 9 is a schematic representation of a cutterhead according to another embodiment of the invention wherein the drive shaft passes through the housing hub into the spool housing.

In the embodiment of the cutterhead shown in FIG. 9, the drive shaft 2 is inserted through the housing hub 5 into the housing 3. However, there is no direct form-tight connection between the drive shaft and the housing. The spool 4 is held in the housing 3 by the helical spring 31 which is braced against a bump button 33. The bump button 33 actuates the indexing device 29 to pay out filament as already described. The drive shaft 2 is threadably secured at its shaft tip by a hexagonal nut 37 on the housing. The shaft tip projects from the housing hub 5. The hexagonal nut 37 is axially movable in the bump button 33 and lies so that it cannot rotate relative thereto. The hexagonal nut 37 is held via a snap ring 56 in the housing of the bump button 33. The indexing gate of the indexing device 29 is configured as in the embodiment of FIGS. 1 and 2 on the inner side of the spool 4.

Figure 10:
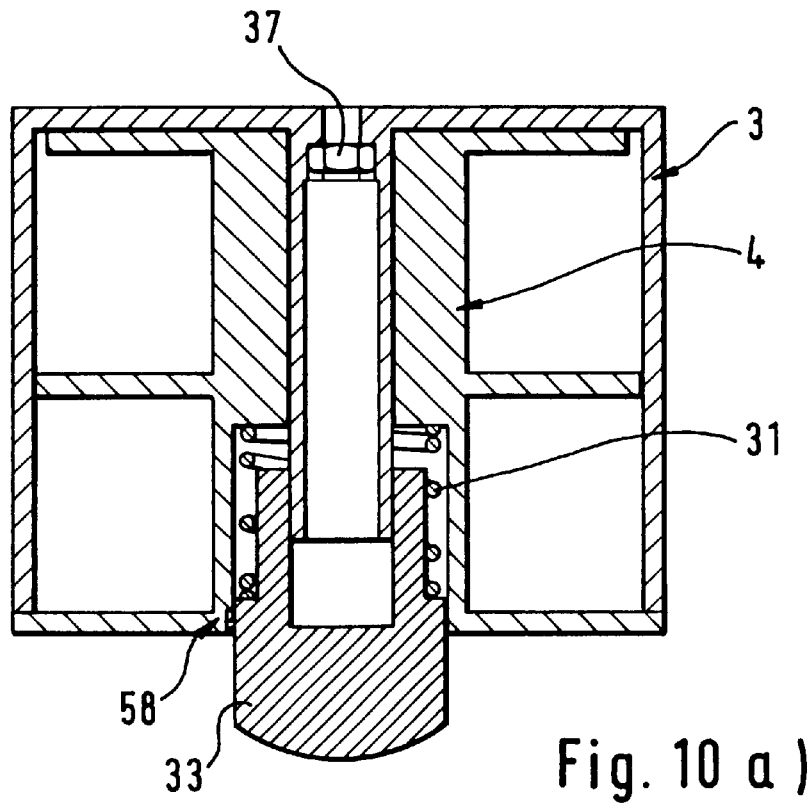
FIG. 10a is a schematic representation, in section, of a cutterhead which can be completely assembled without the drive shaft.
FIG. 10b is a schematic showing a bayonet connection on bump button.
Figure 10:
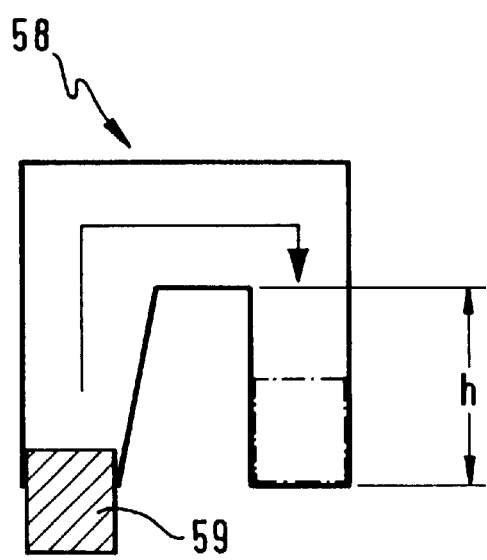

FIG. 10a shows a schematic cross section of a cutterhead which can be completely assembled without the drive shaft and can be later joined to the drive shaft. The housing 3 is fixedly connected with a nut 37 into which the threaded tip of the drive shaft is threadably engaged. The spool 4 is held in the housing 3 by a helical spring 31 as described with respect to the other embodiments. The helical spring 31 is supported on the bump button 33 to actuate the indexing device. The indexing gate of the indexing device is formed on the interior of the spool 4. The bump button 33 is connected to the housing hub via a bayonet connection 58.

As shown in FIG. 10b, a bayonet pin 59, which is configured on the bump button, is slidably arranged in the bayonet guide of the bayonet connection 58. The guide is provided in the interior space of the spool 4. The bayonet connection 58 must be matched to the arrangement of the indexing device. The stroke h of the bayonet connection is greater than the maximum opening stroke of the indexing device so that an opening of the bayonet connection 58 is precluded when indexing or when winding up the replacement filament.

Figure 11A:
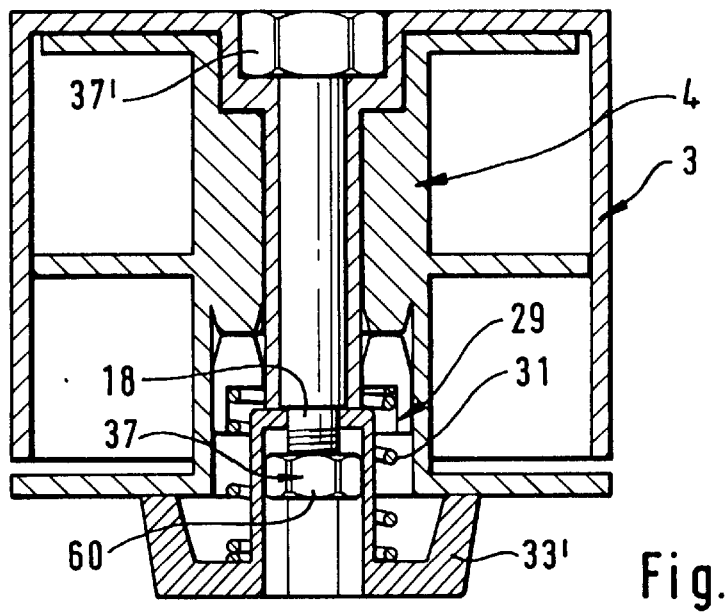
FIG. 11a is a side elevation view, in section, of another embodiment of a cutterhead of the invention wherein the drive shaft is inserted into the housing of the spool.

In the embodiment of the cutterhead shown in FIG. 11a, the drive shaft is inserted into the housing 3 and is connected via a hexagonal nut 37' to the closed end of the housing 3 so that the drive shaft cannot rotate with respect to the housing.

In this embodiment too, the helical spring 31 is supported on a bump button 33' with the helical spring 31 being provided for resetting the indexing device. The bump button 33' is not movable in the housing which is in contrast to the embodiments described hereinabove. The drive shaft is guided through the bump button 33' and is axially fixed on its drive tip by a nut 37. The helical spring 31 is supported at one end thereof on the rear side of the bump button 33' and, on the other end, resiliently biases the indexing device which is operatively connected to the spool 4.

Figure 11B:
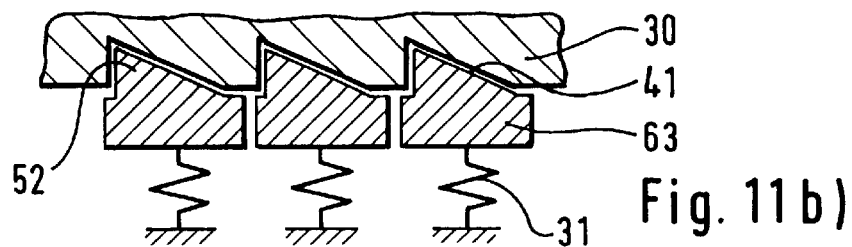

FIG. 11b shows the operation of the indexing device of FIG. 10a. The helical spring 31 is braced on the entrainment ratchet teeth and urges these ratchet teeth into an indexing gate 30 in the spool. If the cutterhead is tapped against the ground to be mowed, then the ratchet teeth 52 are deflected against the spring 31 because of their inertial characteristics and the spool is enabled for the pay out of filament until the next engagement with the ratchet teeth 52. The entraining ratchet teeth 52 are formed on mass pieces 63. The masses of the movable indexing member are so matched to the spring characteristics of the helical spring (spring force/spring displacement) that the spool is stopped in the next latch position for a pay-out operation.

Figure 12:
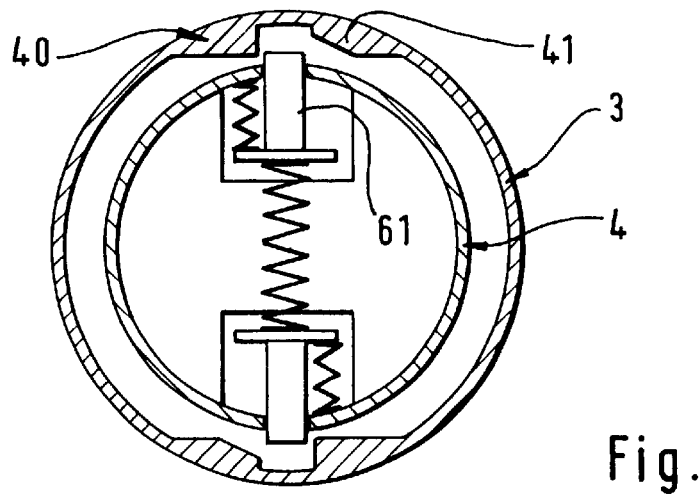
FIG. 12 is a schematic of an embodiment of the indexing device according to another embodiment of the invention.

FIG. 12 shows an embodiment wherein ratchet teeth 40 are formed on the inner side of the housing 3. These ratchet teeth are engaged from behind by the movable indexing member and are entrained. The indexing member is formed as an indexing pin 61 in this embodiment. Two diametrically opposite lying indexing pins 61 are provided. These indexing pins 61 are arranged on the spool 4 and are movable against the spring force along their pin axis. If the cutterhead is driven, then the indexing pins are deflected as a consequence of the occurring centrifugal forces and are brought into engagement with the ratchet teeth 40. In an indexing operation, the spool 4 is axially displaced and the indexing pins 61 are moved out of drive engagement into the indexing gate. The winding of replacement filament on the spool 4 is possible because of the configuration of the ratchet teeth with ramp paths 41.

Figure 13:
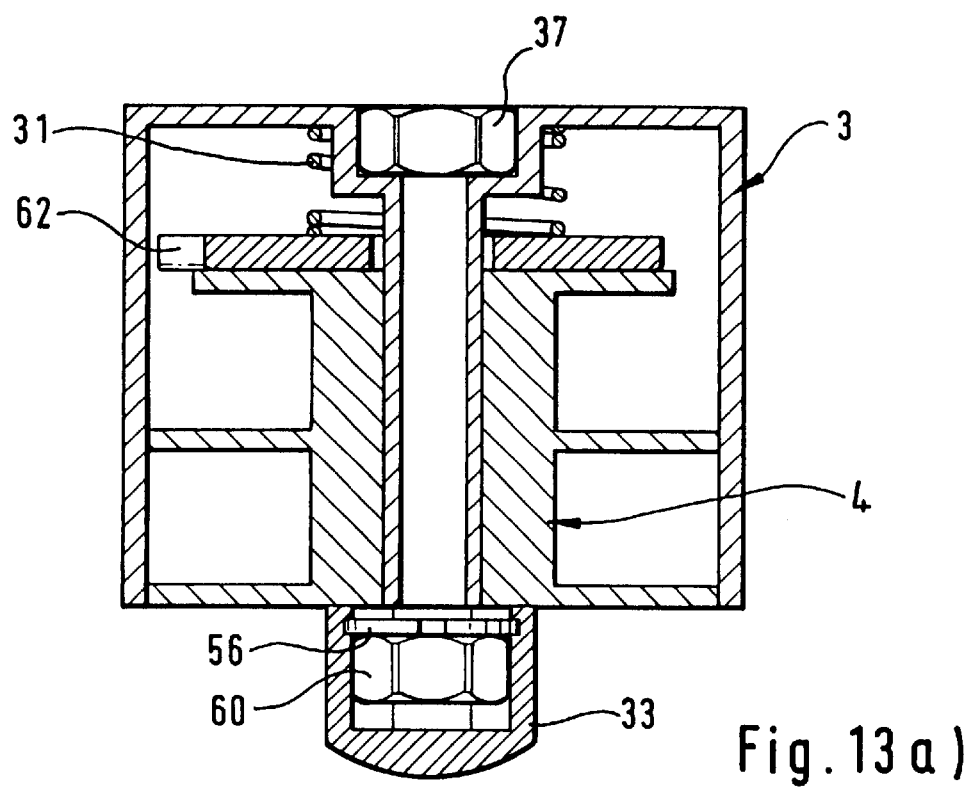
Figure 13:
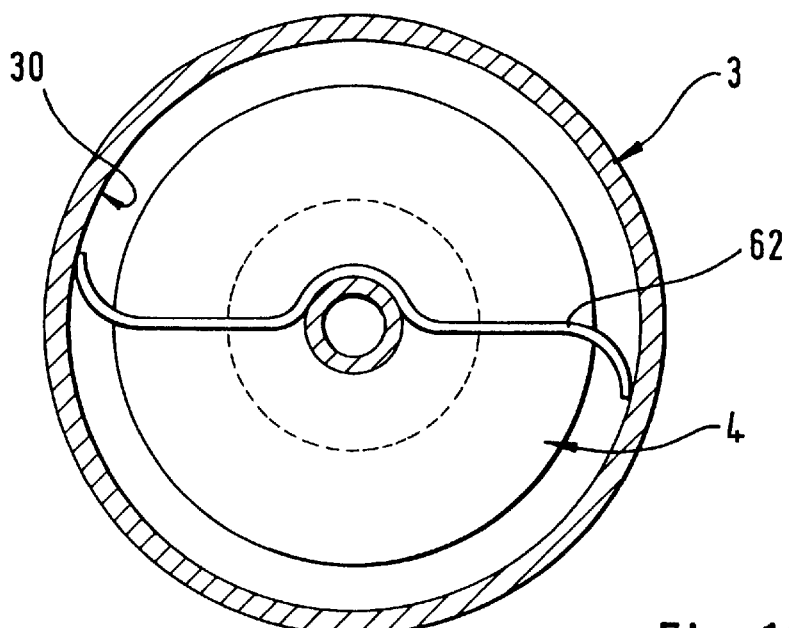

FIGS. 13a and 13b show an embodiment of the cutterhead wherein the spool 4 executes an axial movement during a pay-out operation. When winding up a replacement filament, the spool 4 is rotationally moved without an axial stroke. The form-tight drive connection between the drive shaft and the housing 3 is provided by a hexagonal connection 37. A helical spring 31 is supported on the closed base of the pot-shaped housing 3 and axially biases the spool 4. The spool 4 is held against a bump button 33. A nut 60 fixes the shaft tip of the drive shaft on the housing hub. The nut 60 is arranged in the bump button 33 fixed against rotation relative thereto and is accommodated with a snap ring 56 so as to be axially moveable. The indexing spring 62 is fixedly connected to the spool 4 and this spring is disposed between the spool 4 and the helical spring 31. The indexing spring 62 passes diametrically through the circular housing. The ends of the indexing spring 62 coact with an indexing gate formed on the housing 3. As shown in FIG. 13b, the ends of the indexing spring 62 are bent in respective oppositely disposed directions so that either a blockage or a release of the movement takes place in dependence upon the direction of the relative rotational movement of the housing relative to the indexing spring. The blockage defines the drive connection between the housing 3 and the spool 4; whereas, the enabled rotational movement is provided for winding up a replacement filament. When the bump button is tapped against the ground to be mowed, the spool 4 is pressed into the housing and the indexing spring 62 is brought by the axial movement out of working engagement into the indexing gate 30.

It is understood that the foregoing description is that of the preferred embodiments of the invention and that various changes and modifications may be made thereto without departing from the spirit and scope of the invention as defined in the appended claims.

What is claimed is:

1. A cutterhead for a portable handheld brushcutter having a drive shaft defining a drive axis about which the cutterhead is rotatably driven, the cutterhead being mounted on the free end of the drive shaft and comprising:

a pot-shaped housing having an open end and having a housing hub formed inside said housing and extending to said open end of said pot-shaped housing;

said pot-shaped housing being held on the end portion of said drive shaft with said housing hub so as to permit said housing to be driven by said drive shaft;

a spool accommodated in said housing and having a spool hub held on said housing hub;

said spool having a radial partition wall extending about the periphery of said spool to form first and second spool chambers;

said spool chambers being adapted to contain first and second cutting filaments, respectively, and each of said cutting filaments having first and second ends;

said pot-shaped housing having a peripheral wall axially surrounding said spool;

said pot-shaped housing having two exit openings formed in said peripheral wall through which corresponding ones of said cutting filaments extend into free space with their first ends;

said partition wall lying at the same axial elevation as said exit openings;

said partition wall defining a plane transverse to said axis and having first and second lead-in channels formed in said partition wall corresponding to said first and second spool chambers, respectively;

said first lead-in channel being provided for guiding in the second end of said first cutting filament into the interior of said first spool chamber;

said second lead-in channel being provided for guiding in the second end of said second cutting filament into the interior of said second spool chamber;

said first and second lead-in channels having respective entrances configured as first and second insert funnels, respectively, tapered in the direction in which the corresponding cutting filament is lead in;

said plane having a first side facing toward said first spool chamber and a second side facing toward said second spool chamber;

each of said insert funnels having a funnel wall defining the insert funnel and having a filament guide;

the filament guide of said first insert funnel being defined by a radially shortened section of the wall of said first insert funnel disposed on said first side of said plane;

the filament guide of said second insert funnel being defined by a radially shortened section of the wall of said second insert funnel disposed on said second side of said plane; and, said first and second lead-in channels extending nonlinearly in said spool.

2. The cutterhead of claim 1, wherein each of said lead-in channels has a channel segment extending angled or tapered in said spool with an edge lying inwardly of the angled or tapered channel segment.

3. The cutterhead of claim 2, each of said lead-in channels including a radial first segment extending from the insert funnel in an approximately radial direction and a sharp-edged angled axial second segment.

4. The cutterhead of claim 3, said second segment of the lead-in channel having an outer-lying wall portion facing toward the entrance of the lead-in channel and said outer-lying wall portion having a course so as to cause the inserted filament to impinge thereon at an obtuse angle.

5. The cutterhead of claim 4, wherein said outer-lying wall portion is configured as an arc.

6. The cutterhead of claim 5, wherein said pot-shaped housing defines a closed wall surrounding said spools and each of said lead-in channels is angled in the direction of the closed wall of said pot-shaped housing.

7. The cutterhead of claim 1, wherein said first and second lead-in channels are a first pair of lead-in channels; and, wherein said cutterhead comprises several pairs of said lead-in channels and said pairs of lead-in channels being arranged rotationally symmetrical to each other on the periphery of said partition wall.

8. The cutterhead of claim 7, wherein at least three pairs of said first and second lead-in channels are provided; and, the lead-in channels of said spool chambers, respectively, are alternately arranged on the periphery of said spool.

9. The cutterhead of claim 1, wherein the wall of each insert funnel has an edge facing toward said peripheral wall of said pot-shaped housing; the wall of each insert funnel has a wall section disposed laterally in the peripheral direction of said spool; and, said edge is drawn inwardly toward said axis at said wall section to form a lateral cutout in the insert funnel.

10. The cutterhead of claim 9, wherein the edge in said wall section has a conical shape when viewed in side elevation.

11. The cutterhead of claim 1, wherein said funnel has a first diameter in the vertical direction and a second diameter in the peripheral direction of said spool and said second diameter is greater than said first diameter.

12. The cutterhead of claim 7, wherein said end portion of said shaft and said pot-shaped housing conjointly define a drive assembly; and, wherein said cutterhead further comprises an indexing device arranged between said drive assembly and said spool for permitting an incremental rotation of said spool relative to said housing to pay out incremental lengths of said cutting filament; said indexing device including:

an indexing gate formed on said spool;

an indexing member movably mounted on said drive assembly between a first position wherein said indexing member engages said indexing gate for entraining and rotating said spool with said drive assembly and a second position wherein said indexing member and said indexing gate are disengaged to permit said incremental rotation of said spool; and, a spring for resiliently biasing said indexing member in said first position.

13. The cutterhead of claim 12, wherein said indexing member includes a set of first teeth and said indexing gate includes a set of second teeth which intermesh with said first teeth while said indexing member is in said first position; one of said first and second teeth being configured as ratchet teeth; and, each of said ratchet teeth having a ramp dropping off in the direction of rotation of said drive assembly.

14. The cutterhead of claim 13, said indexing member and said indexing gate defining a plurality of engagement locations whereat said indexing member is in said first position and whereat each one of said first teeth is in engagement with a corresponding one of said second teeth; said pairs of lead-in channels being arranged rotationally symmetrical to each other on the periphery of said partition wall so as to be spaced from each other by the same angle; and, each pair of mutually engaging first and second teeth being at angular positions so as to bring each pair of said lead-in channels into overlapment with said exit openings.

15. The cutterhead of claim 13, wherein said indexing gate includes stop means for engaging said first teeth of said indexing member when said indexing member is moved into said second position; and, said stop means being disposed at an elevation along said axis corresponding to said second position of said indexing member.

16. The cutterhead of claim 15, said first and second teeth conjointly defining a number of latch positions whereat said first and second teeth latch when said indexing member is in said first position, said stop means including a plurality of stops corresponding in number to said latch positions.

17. The cutterhead of claim 12, wherein said spool defines an interior space and said indexing gate is formed in said interior space.

18. The cutterhead of claim 12, said indexing device including a bump button mounted at said open end of said pot-shaped housing so as to be movable along said axis so as to move said indexing member against the force of said spring into said second position when said bump button is tapped against the ground being mowed.

* * * * *